(12) United States Patent
Yeleswarapu et al.

(10) Patent No.: US 9,614,848 B2
(45) Date of Patent: Apr. 4, 2017

(54) PROVIDING UNIQUE IDENTIFIERS VIA A USER DEVICE

(71) Applicants: Cellco Partnership, Basking Ridge, NJ (US); Verizon Patent and Licensing Inc., Basking Ridge, NJ (US)

(72) Inventors: Chandrasekhar Yeleswarapu, Walnut Creek, CA (US); Piyush Jethwa, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 697 days.

(21) Appl. No.: 13/872,666

(22) Filed: Apr. 29, 2013

(65) Prior Publication Data
US 2014/0325025 A1 Oct. 30, 2014

(51) Int. Cl.
*G06F 15/16* (2006.01)
*H04L 29/06* (2006.01)

(52) U.S. Cl.
CPC ............. *H04L 63/10* (2013.01); *H04L 63/02* (2013.01)

(58) Field of Classification Search
CPC ................................ H04L 63/10; H04L 63/02
USPC ................................................. 709/217, 219
See application file for complete search history.

(56) References Cited

U.S. PATENT DOCUMENTS

| 7,010,582 B1* | 3/2006 | Cheng | H04L 63/0815 709/219 |
| 8,726,406 B2* | 5/2014 | Catrein | G06F 21/10 713/168 |
| 2003/0120822 A1* | 6/2003 | Langrind | H04L 61/2092 709/251 |
| 2011/0311052 A1* | 12/2011 | Myers | G07C 9/00103 380/270 |

OTHER PUBLICATIONS

Zakas, Nicholas C., "Learning from XAuth: Cross-domain localStorage", Sep. 7, 2010, www.nczonline.net/blog/2010/09/07/learning-from-xauth-cross-domain-localstorage/, 6 pages.

* cited by examiner

*Primary Examiner* — David Lazaro
*Assistant Examiner* — Marie Georges Henry

(57) ABSTRACT

A user device may receive a request for content; provide the request to a first server; receive an instruction based on providing the request for content; and provide a message to a second server based on receiving the instruction. The message may cause the second server to embed a unique identifier (ID) of the user device in the message to form a modified message for transmission to a third server. The modified message may cause the third server to form an object having the unique ID. The user device may receive the object based on providing the message to the second server; provide the object to the first server or to a fourth server; and receive, from the first server or the fourth server, particular content based on providing the object to the first server or the fourth server. The particular content may be based on the unique ID.

20 Claims, 6 Drawing Sheets

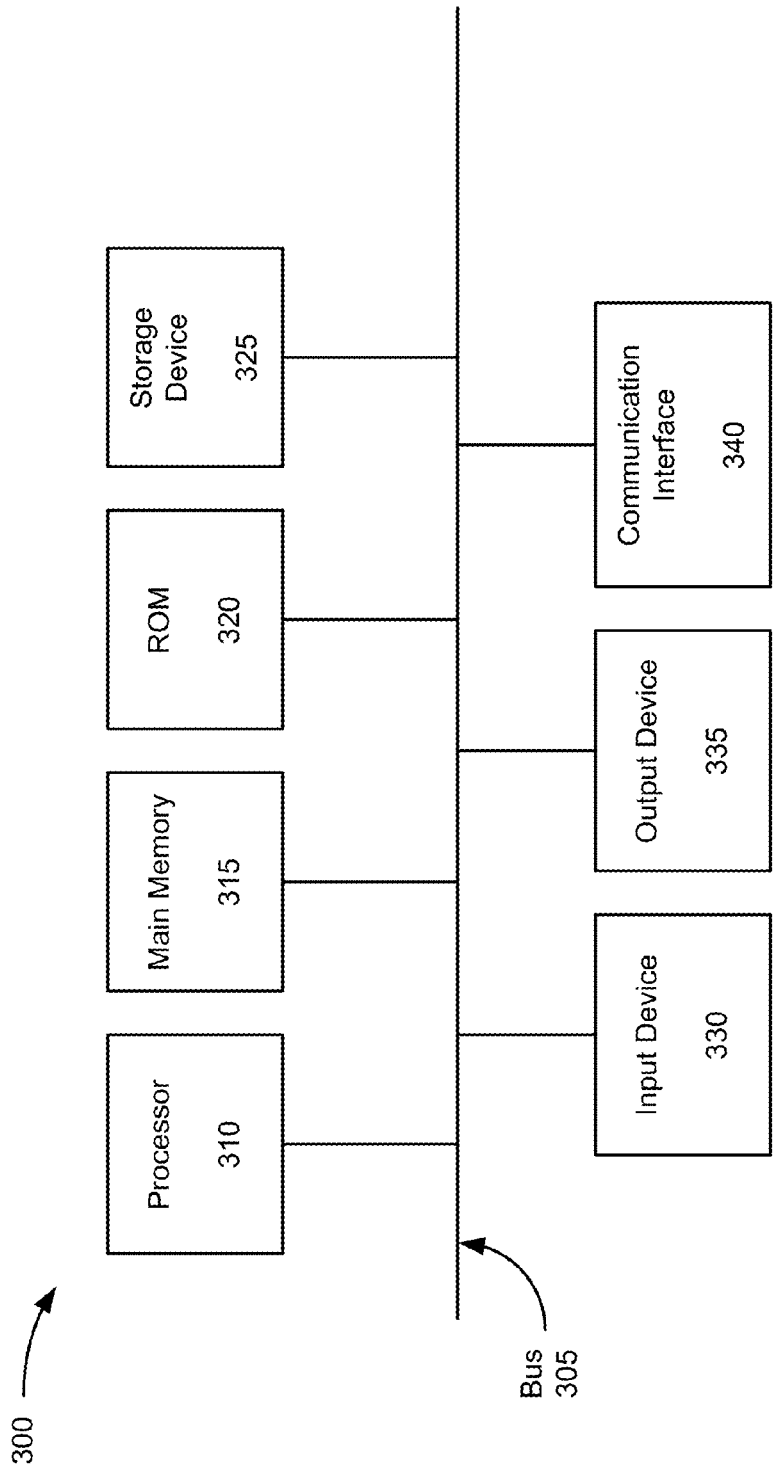

| User Device Information 410 | | User Information 430 | | | | |
|---|---|---|---|---|---|---|
| SIM | IMEI | Unique ID 420 | Demographics | Authentication Information | Subscription Information | User Device Type | Browsing History |
| SIM 1 | IMEI 1 | Unique ID 1 | Demographics information set 1 | Authentication information set 1 | Subscriber information set 1 | User Device Type A | Browsing history information set 1 |
| SIM 2 | IMEI 2 | Unique ID 2 | Demographics information set 2 | Authentication information set 2 | Subscriber information set 2 | User Device Type B | Browsing history information set 2 |
| SIM 3 | IMEI 3 | Unique ID 3 | Demographics information set 3 | Authentication information set 3 | Subscriber information set 3 | User Device Type A | Browsing history information set 3 |
| SIM 4 | IMEI 4 | Unique ID 4 | Demographics information set 4 | Authentication information set 4 | Subscriber information set 4 | User Device Type C | Browsing history information set 4 |
| SIM 5 | IMEI 5 | Unique ID 5 | Demographics information set 5 | Authentication information set 5 | Subscriber information set 5 | User Device Type E | Browsing history information set 5 |

PROVIDING UNIQUE IDENTIFIERS VIA A USER DEVICE

BACKGROUND

Content providers may provide services, applications, and/or content (e.g., to a user device via a service provider network) that are targeted to a user of the user device. The service provider network, however, may not permit the content providers to access information, associated with the users, due to security concerns, such as protecting identities of the users and/or safeguarding confidential information associated with the users. The content providers may, thus, not be able to provided targeted services, applications, and/or content that the users can use and/or that the users desire to receive.

BRIEF DESCRIPTION OF THE DRAWINGS

FIG. 3 illustrates example components of a device that may be used within the environment of FIG. 2;

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide a technique to pass an identifier (e.g., a unique identification header (UIDH)), associated with a user device, to a consumer of the unique identifier (e.g., a content provider or the like). In some implementations, the content provider may use the identifier to determine information associated with the user device, such as demographics information for a user of the user device, authentication information, subscription information, user device type information, and/or some other information associated with the user device. In some implementations, the content provider may provide particular content to the user device (e.g., a targeted advertisement, subscribed content, etc.) based on the information associated with the user device. In some implementations, the content provider may not determine some information regarding the user device, such as identity information of a user associated with the user device (e.g., the user's name, address, e-mail address, billing information, etc.). For example, the identifier may not be associated with the user's identity. As a result, the user may receive content from the content provider based on the identifier of the user device without divulging the identity of the user.

Figure 1:
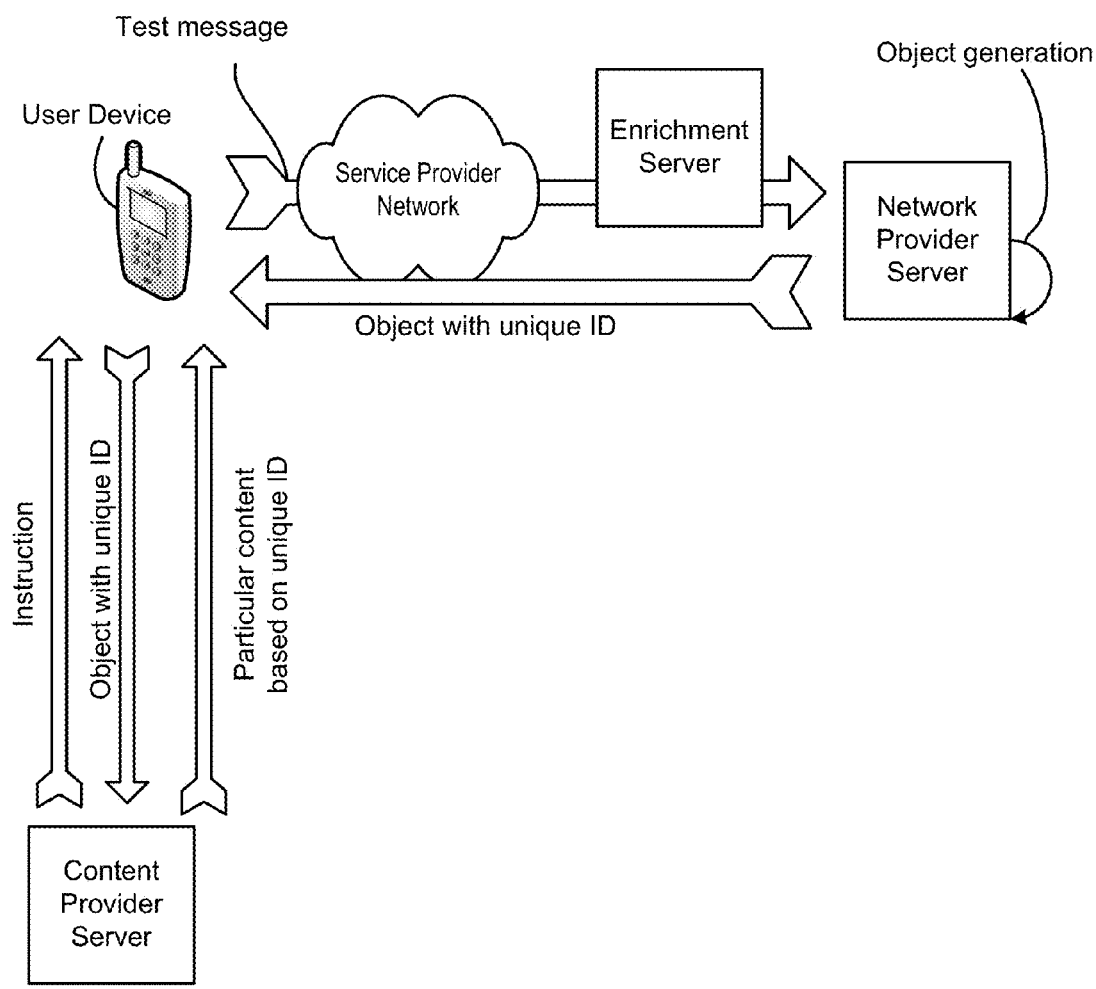
FIG. 1 illustrates an example overview of an implementation described herein.

FIG. 1 illustrates an example implementation as described herein. As shown in FIG. 1, a content provider server may provide an instruction to a user device (e.g., as a part of a response to a request for content). In some implementations, the instruction may direct the user device to provide an identifier of the user device (e.g., to allow the content provider to provide particular content to the user device). In some implementations, the user device may provide a test message (e.g., based on receiving the instruction from the content provider server) towards a network provider server (e.g., via a service provider network).

In some implementations, an enrichment server, associated with the service provider network, may receive the test message and embed the identifier (e.g., a unique identifier (ID)) of the user device in a header of the test message. The network provider server may receive the test message with the unique ID and may generate an object (e.g., a token, a JavaScript Object Notation (JSON) object, or the like) having the unique ID. In some implementations, the user device may provide the object to the content provider sever to allow the content provider server to determine the unique ID from the object and determine information, associated with the user device, based on the unique ID.

In some implementations, the user device may store the object in a local storage of the user device (e.g., to allow the content provider server to receive the object and the unique ID without the user device needing to communicate with the network provider server). In some implementations, the user device may provide the object to some other device (e.g., an application server or the like) that may use the unique ID to provide content to the user device (e.g., on behalf of the content server), allow access to a particular application or service, or use the unique ID for some other purpose.

Figure 2:
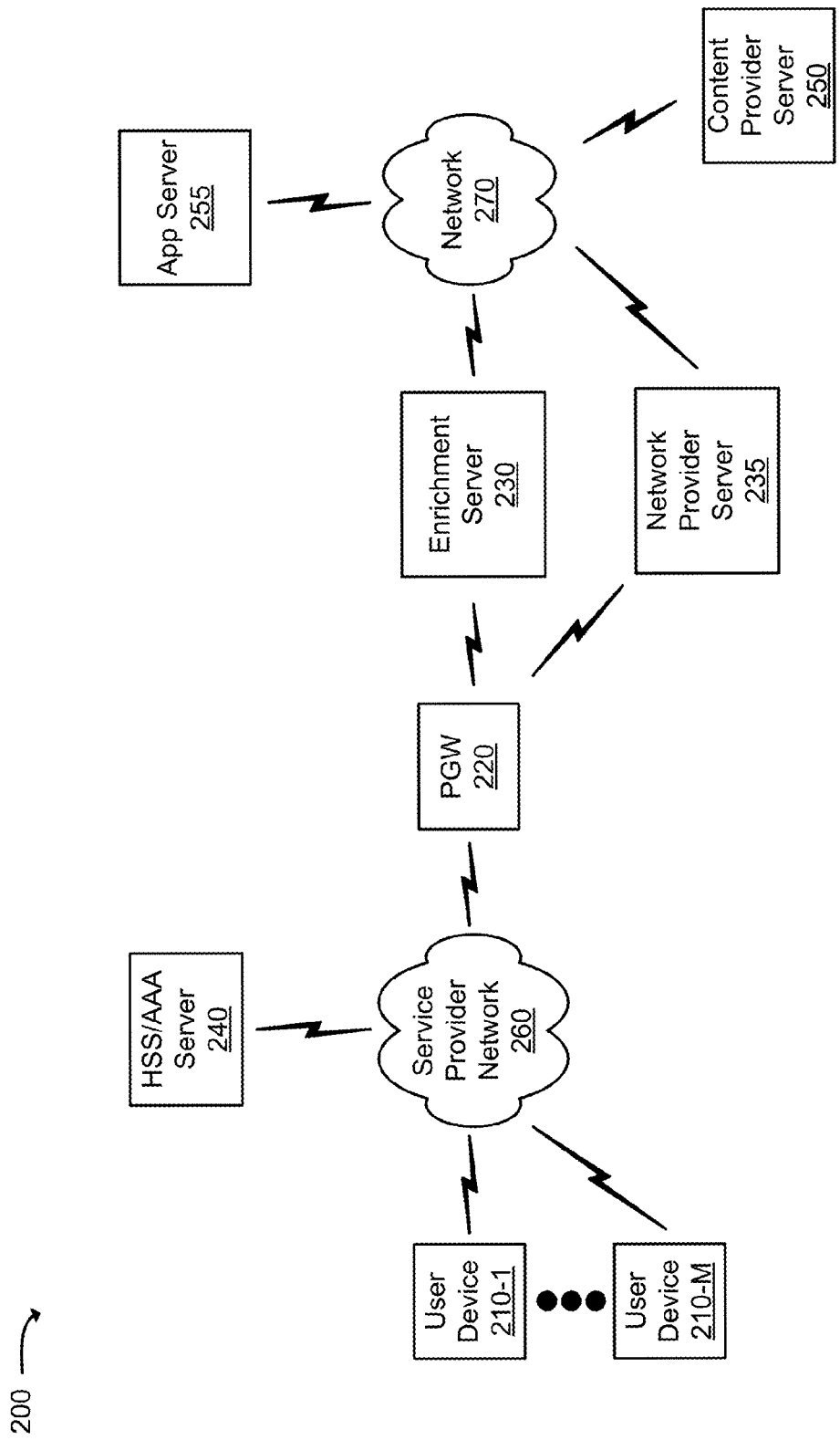
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210, . . . , 210-M (where M≥1), a packet data network (PDN) gateway (PGW) 220, an enrichment server 230, a network provider server 235, a home subscriber server (HSS)/authentication, authorization, accounting (AAA) server 240 (referred to as an "HSS/AAA server 240"), a content provider server 250, an application server 255 (referred to as "app server 250"), a service provider network 260, and a network 270.

In some implementations, one or more of the devices of environment 200 may perform one or more functions described as being performed by another one or more of the devices of environment 200. Devices of environment 200 may interconnect via wired connections, wireless connections, or a combination of wired and wireless connections.

User device 210 may include a computation or communication device, such as a wireless mobile communication device that is capable of communicating via a network (e.g., service provider network 260 and/or network 270). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, a set-top box, or another type of computation or communication device. User device 210 may send data to and/or receive data from network 270 (e.g., via service provider network 260).

In some implementations, user device 210 may store an object that includes a unique ID of user device 210. For example, user device 210 may store the object in a particular directory accessible by a particular content provider server 250. Additionally or alternatively, user device 210 may store a string of characters of text, corresponding to the unique ID, in a persistent storage medium of user device 210 (e.g., a clipboard/pasteboard). In some implementations, user device 210 may provide the object and/or the string of characters of text to content provider server 250 and/or to app server 255.

PGW 220 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. PGW 220 may, for example, provide connectivity of user device 210 to external packet data networks by being a traffic exit/entry point for user device 210. PGW 220 may perform policy enforcement, packet filtering, charging support, lawful intercept, and/or packet screening. In some implementations, PGW 220 may include a device that aggregates traffic received from one or more user devices 210, and sends the aggregated traffic to enrichment server 230. Alternatively, or additionally, PGW 220 may receive traffic from enrichment server 230 and/or network provider server 235 and may send the traffic toward user device 210. In some implementations, PGW 220 may perform a network address translation (NAT) operation when a request to communicate with service provider network 260 and/or network 270 is received from user device 210. Additionally, or alternatively, PGW 220 may obtain, from the request, information associated with a subscriber of service provider network 260 and may communicate with HSS/AAA 240 to authenticate the subscriber based on the information associated with the subscriber. PGW 220 may generate NAT bindings as a result of the NAT operation and may transmit, as session information, information associated with NAT bindings and/or the information associated with the subscriber.

Enrichment server 230 may include one or more computing devices, such as a server device or a collection of server devices. In some implementations, enrichment server 230 may receive a test message from user device 210 and may generate a unique ID based on information associated with user device 210 (e.g., information obtained from session information associated with user device 210). In some implementations, enrichment server 230 may generate a modified message, corresponding to the test message, by inserting the unique ID into a packet associated with the test message (e.g., into a packet header, trailer, payload, etc.). In some implementations, enrichment server 230 may provide the modified message to network provider server 235. In some implementations, enrichment server 230 may associate the unique ID with information stored by HSS/AAA server 240 (e.g., demographics information, subscriber information, user profile information, browsing history, etc.).

Network provider server 235 may include one or more computing devices, such as a server device or a collection of server devices. In some implementations, network provider server 235 may receive a modified test message from enrichment server 230 and may identify a unique ID associated with the test message. In some implementations, network provider server 235 may generate an object (e.g., a token, a JSON object, or the like) based on receiving the test message. The object may include information that identifies the unique ID and may include a time-to-live (TTL) value or some other information that identifies an expiration of the object.

HSS/AAA server 240 may include one or more computing devices, such as a server device or a collection of server devices. In some implementations, HSS/AAA server 240 may manage, update, and/or store, in a memory associated with HSS/AAA server 240, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, browsing history of user device 210, demographics information of a user associated with user device 210, and/or other information associated with user device 210. Additionally, or alternatively, HSS/AAA server 240 may include a device that performs authentication, authorization, and/or accounting (AAA) operations associated with a communication connection with user device 210. In some implementations, HSS/AAA server 240 may store a unique ID for user device 210 that corresponds to the information associated with user device 210. In some implementations, HSS/AAA server 240 may provide the information, associated with user device 210, in response to a request for the information that includes the unique ID.

Content provider server 250 may include one or more computing devices, such as a server device or a collection of server devices. In some implementations, content provider server 250 may provide any type or form of content. For example, content provider server 250 may provide video, audio, images, advertising content, web pages, text, data, and/or some combination thereof. Content provider server 250 may receive (e.g., from app server 255), targeted content, such as advertising content, etc., that corresponds to a unique ID and may provide, via a particular user device 210, the targeted content and/or other content to a user with which the unique ID is associated. Additionally or alternatively, content provider server 250 may store the targeted content and may provide the targeted content to user device 210 without receiving the target content from app server 255.

App server 255 may include one or more computing devices, such as a server device or a collection of server devices. In some implementations, app server 255 may correspond to an advertisement server and may maintain targeted content, such as advertising content, etc., that corresponds to a unique ID associated with a user (e.g., a subscriber) associated with user device 210. Additionally, or alternatively, app server 255 may provide applications and/or services, such as games, scripts, messaging services, banking services, etc. App server 255 may communicate with a particular user device 210, subscribed to service provider network 260, to perform electronic transactions to provide a good and/or service in exchange for payment information from user device 210.

Service provider network 260 may include one or more wired and/or wireless networks via which user devices 220 communicate and/or receive content. For example, service provider network 260 may include a cellular network, the Public Land Mobile Network (PLMN), a second generation (2G) network, a third generation (3G) network, a fourth generation (4G) network (e.g., a long term evolution (LTE) network), a fifth generation (5G) network, and/or another type of network. Additionally, or alternatively, service provider network 260 may include a wide area network (WAN), a metropolitan area network (MAN), an ad hoc network, an intranet, a fiber optic-based network, and/or a combination of these or other types of networks.

In some implementations, service provider network 260 may include network devices, such as base stations (eNodeB devices), routers, switches, gateways, or the like, to connect with user device 210 to allow user device 210 to send traffic to/from service provider network 260 and/or network 270. In some implementations, service provider network 260 may include a device to communicate with HSS/AAA server 240 to identify authentication information for user device 210 to allow user device 210 to connect to service provider network 260 (e.g., based on user device subscription information stored by HSS/AAA server 240).

Network 270 may include one or more wired and/or wireless networks. For example, network 270 may include a cellular network, the PLMN, a 2G network, a 3G network, a 4G network (e.g., a LTE network), a 5G network, and/or another network. Additionally, or alternatively, network 270 may include a WAN, a MAN, a telephone network (e.g., the Public Switched Telephone Network (PSTN)), an ad hoc network, an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates example components of a device 300 that may be used within environment 200 of FIG. 2. Device 300 may correspond to user device 210, PGW 220, enrichment server 230, network provider server 235, HSS/AAA server 240, content provider server 250, and/or app server 255. Each of user device 210, PGW 220, enrichment server 230, network provider server 235, HSS/AAA server 240, content provider server 250, and/or app server 255 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIG. 4 illustrates an example data structure 400 that may be stored by one or more devices in environment 200. In some implementations, data structure 400 may be stored in a memory of enrichment server 230 and/or HSS/AAA server 240. In some implementations, data structure 400 may be stored in a memory separate from, but accessible by, enrichment server 230 and/or HSS/AAA server 240. In some implementations, data structure 400 may be stored by some other device in environment 200, such as PGW 220 and/or network provider server 235.

A particular instance of data structure 400 may contain different information and/or fields than another instance of data structure 400. In some implementations, data structure 400 may include information that identifies a unique ID for user device 210 and corresponding information for a user of user device 210.

As shown in FIG. 4, data structure 400 may include user device information field 410, unique ID field 420, and user information field 430.

User device information field 410 may include information that uniquely identifies a particular user device 210 that is subscribed to service provider network 260. For example, user device information field 410 may store a subscriber identity module (SIM) card number, an international mobile equipment identifier (IMEI), an integrated circuit card identifier (ICCID), a hardware serial number, a telephone number, and/or some other information that uniquely identifies the particular user device 210.

Unique ID field 420 may include information that identifies a corresponding unique ID for a particular user device 210. In some implementations, the unique ID may include a string of characters having any length and any format. In some implementations, enrichment server 230 may generate the unique ID for user device 210 based on session information associated with user device 210 (e.g., when user device 210 communicates with PGW 220 via the session). For example, the session information may include the IMEI of user device 210, the SIM card number of user device 210, and/or some other information of user device 210 that enrichment server 230 may use to generate the unique ID (e.g., authentication/subscription information stored by HSS/AAA server 240). In some implementations, enrichment server 230 may generate the unique ID by using an algorithm with the session information as an input. For example, enrichment server 230 may generate a hash value based on the session information to generate the unique ID.

User information field 430 may include information that identifies information of a user associated with a particular user device 210. For example, user information field 430 may store demographics information, authentication information, subscription information, user device type information (e.g., smart phone, tablet, desktop, etc.), browsing history information, and/or some other information associated with the user. In some implementations, enrichment server 230 may generate a unique ID and associate the unique ID with user information based on information stored by user information field 430. In some implementations, user information field 430 may not store identity information regarding the user. As a result, the unique ID may not be used to identify the user's identity.

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible.

Figure 5:
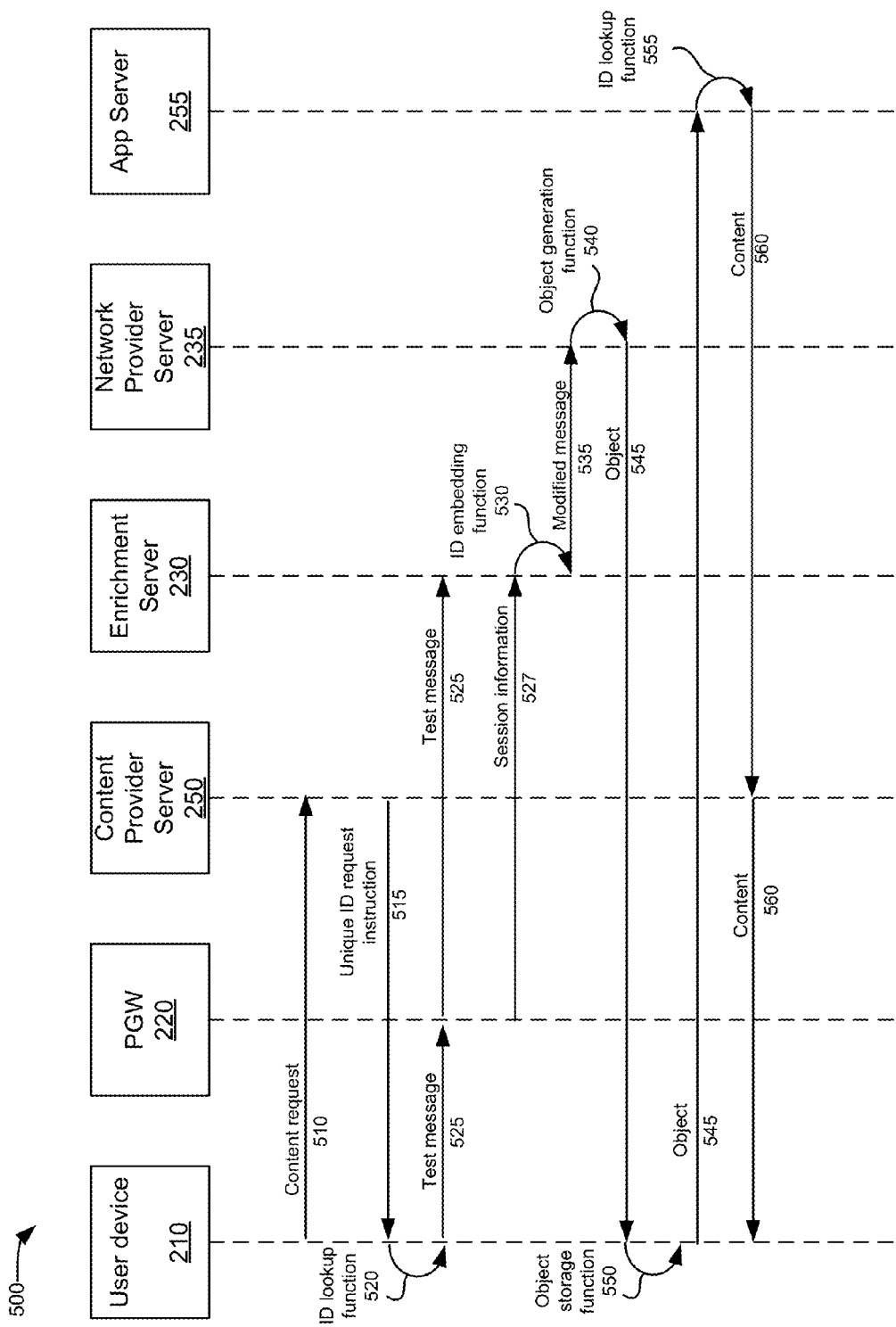
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include user device 210, PGW 220, enrichment server 230, network provider server 235, content provider server 250, and app server 255. In some implementations, user device 210, PGW 220, enrichment server 230, network provider server 235, content provider server 250, and app server 255 may include components and/or perform functions described above in connection with, for example, one or more of FIGS. 1-3. FIG. 5 may illustrate example operations to provide a unique ID to content provider server 250 and/or to app server 255.

In some implementations, user device 210 may provide content request 510 to content provider server 250. For example, user device 210 may receive an instruction from a user of user device 210 to provide content request 510 (e.g., to receive content from content provider server 250, such as web page content, video content, audio content, etc.). In FIG. 5, assume that content request 510 includes a request to receive content based on a unique ID of user device 210. For example, content request 510 may include a request to receive content corresponding to a web page that includes a portion that is reserved for targeted content based on the unique ID. Additionally or alternatively, content request 510 may include a request to receive content that may be provided based on subscription information associated with user device 210 (e.g., as identified by the unique ID). Additionally or alternatively, content request 510 may include a request to access a service based on authentication information that may be identified using the unique ID. Additionally or alternatively, content request 510 may include some other type of request that is associated with the unique ID.

In some implementations, content provider server 250 may provide unique ID request instruction 515 to user device 210 based on receiving content request 510. For example, unique ID request instruction 515 may include a script (e.g., a Java script and/or some other type of script), an executable file, and/or some other type of instruction or file that user device 210 may execute. In some implementations, unique ID request instruction 515 may include information that identifies a particular app server 255 that may receive the unique ID (e.g., to identify content to provide to user device 210 based on the unique ID). In some implementations, unique ID request instruction 515 may include information associated with content provider server 250, such as information that identifies a particular directory in a storage of user device 210 that content provider server 250 may access (e.g., based on a domain of content provider server 250, an identifier of content provider server 250, and/or some other information regarding content provider server 250).

In some implementations, user device 210 may perform ID lookup function 520 based on receiving unique ID request instruction 515. In some implementations, user device 210 may access a particular directory and may determine whether a unique ID of user device 210 is stored by the particular directory. For example, user device 210 may store an object (e.g., a token, a JSON object, or the like) associated with the unique ID. In some implementations (e.g., when user device 210 is storing the object), user device 210 may determine whether the object is expired based on information stored with the object that identifies whether the object is expired (e.g., time-to-live information of the object, an expiration date/time of the object, etc.).

In FIG. 5, assume that user device 210 does not store the object or that the object is expired (e.g., when an expiration date/time of the object has elapsed). Given this assumption, user device 210 may provide test message 525 towards network provider server 235 via service provider network 260. For example, unique ID request instruction 515 may direct a connection manager of user device 210 to connect to a network device (e.g., a base station) to connect to service provider network 260 (e.g., based on providing the base station with a radio resource control (RRC) connection request, and/or based on some other technique).

In some implementations, test message 525 may include an HTTP request message (or some other type of message) having a size that is smaller than a particular threshold (e.g., such that network traffic may be minimized when test message 525 is provided toward network provider server 235). In some implementations, test message 525 may include information identifying user device 210 (e.g., an IMEI, a SIM card number, or the like). Alternatively, test message 525 may not include the information identifying user device 210 (e.g., to reduce the size of test message 525 and/or to reduce a security risk associated with including the information in test message 525).

In some implementations, user device 210 may provide test message 525 towards network provider server 235 based on an application of user device 210 directing user device 210 to provide test message 525 (e.g., at regular time intervals, when an object storing the unique ID has expired or does not exist, or at some other time). In some implementations (e.g., when user device 210 provides test message 525 towards network provider server 235 via service provider network 260), PGW 220 may receive test message 525 and provide test message 525 to enrichment server 230 to allow enrichment server 230 to embed a unique ID within test message 525. In some implementations, PGW 220 may determine user device information that uniquely identifies user device 220 when user device 210 connects to service provider network 260 (e.g., an IMEI number, a device ID, a SIM card number, or the like). In some implementations, PGW 220 may determine a public and/or a private address that user device 210 may use when communicating with enrichment server 230 and/or network provider server 235. In some implementations, PGW 220 may provide, to enrichment server 230, the user device information, and/or the public and/or private address information as session information 527.

In some implementations, enrichment server 230 may receive test message 525 (e.g., via PGW 220) and may receive session information 527. In some implementations (e.g., based on receiving test message 525 and session information 527), enrichment server 230 may perform ID embedding function 530 to generate a unique ID for user device 210 and to embed the unique ID into test message 525. For example, enrichment server 230 may generate the unique ID (e.g., based on session information 527) to uniquely identify user device 210. In some implementations, enrichment server 230 may generate the unique ID by using an algorithm with the session information as an input. For example, enrichment server 230 may generate a hash value based on the session information to generate the unique ID. Alternatively, enrichment server 230 may generate the unique ID based on information stored by test message 525 (e.g., information that identifies user device 210).

In some implementations, enrichment server 230 may associate the unique ID with information stored by HSS/AAA server 240 (e.g., demographics information, subscriber information, user profile information, browsing history, etc.). In some implementations, enrichment server 230 may generate the unique ID based on some other information not shown in FIG. 5. For example, enrichment server 230 may generate the unique ID based on an encryption key stored by a key repository and accessible by enrichment server 230. In some implementations, the unique ID may include a string of characters of any length and format and may be generated based on a particular algorithm or number generation technique. In some implementations, the unique ID may be a UIDH and/or some other type of unique ID.

In some implementations, enrichment server 230 may generate modified message 535, corresponding to test message 525, by inserting the unique ID into a packet associated with test message 525 (e.g., into a packet header, trailer, payload, etc.). In some implementations, enrichment server 230 may provide modified message 525 to network provider server 235.

In some implementations, network provider server 235 may receive modified message 535 from enrichment server 230 and may perform object generation function 540 based on receiving modified message 525. In some implementations, network provider server 235 may determine the unique ID based on the packet of modified message 535 that stores the unique ID (e.g., the packet header, trailer, payload, etc.). Based on determining the unique ID, network provider server 235 may generate object 545 including the unique ID and a timestamp that corresponds to an expiration of the object. In some implementations, the timestamp may include a TTL value and/or an expiration date/time of the object. In some implementations, the timestamp may be determined or set based on a design decision based on security protocols and/or network traffic congestion thresholds. For example, a shorter TTL value may correspond to higher security; however, the shorter TTL value may also correspond to higher network traffic. In some implementations, object 545 may include a JSON object, a token, a string of characters, or the like. In some implementations, object 545 may be encrypted.

In some implementations, network provider server 235 may provide object 545 to user device 210. User device 210 may perform object storage function 550 to store object 545. For example, network provider server 235 may provide an instruction to direct user device 210 to store object 545 when network provider server 235 provides object 545 to user device 210. In some implementations, user device 210 may store object 545 using a hypertext markup language (HTML) 5 storage function. Additionally, or alternatively, network provider server 235 may identify the unique ID based on object 545 and may store a string of characters corresponding to the unique ID in a persistent storage medium of user device 210 (e.g., a pasteboard, a clipboard, or the like). Additionally, or alternatively, network provider server 235 may store object 545 (or the unique ID corresponding to object 545) based on some other technique.

In some implementations, network provider server 235 may store object 545 to a local storage directory associated with content provider server 250, such as a directory associated with a domain and/or some other information regarding content provider server 250 (e.g., a directory that content provider server 250 has permission to access). For example, network provider server 235 may determine the directory based on information, associated with unique ID request instruction 515, that identifies a domain and/or other information regarding content provider server 250 that user device 210 may use to determine the directory in which to store object 545.

In some implementations, user device 210 may provide object 545 based on storing object 545. For example, user device 210 may provide object 545 to a consuming device of the unique ID (e.g., a device that provides particular content, access to a service, etc. based on the unique ID of user device 210). In some implementations, user device 210 may determine the consuming device based on information included in unique ID request instruction 515 that identifies the consuming device. In FIG. 5, assume that the consuming device, identified by unique ID request instruction 515, is app server 250. Given this assumption, user device 210 may provide object 545 to app server 255. Additionally, or alternatively, user device 210 may provide object 545 to content provider server 250 (e.g., when the consuming device, identified by unique ID request instruction 515, is content provider server 250). Additionally, or alternatively, user device 210 may provide object 545 to some other device.

In some implementations (e.g., when app server 255 receives object 545), app server 255 may perform ID lookup function 555 to determine information associated with user device 210 based on the unique ID stored by object 545. In some implementations (e.g., as part of ID lookup function 555), app server 255 may decrypt object 545 (e.g., when object 545 is encrypted) and may communicate with HSS/AAA server 240 to receive the information regarding user device 210 based on the unique ID of user device 210 stored by object 545. For example, app server 255 may provide the unique ID as part of a query to HSS/AAA server 240. In some implementations, HSS/AAA server 240 may provide information corresponding to the unique ID to app server 255 as a response to the query (e.g., demographics information, browsing history, subscription information, authentication information, etc.).

In some implementations, HSS/AAA server 240 may provide a portion of the information associated with the unique ID based on a permission level of app server 255 (or another device that queries for the information using the unique ID). For example, as part of the query, app server 255 may include authentication information that identifies particular information that app server 255 may receive. As an example, assume that HSS/AAA server 240 stores demographics information and browsing history data corresponding to particular unique ID. Further, assume that app server 255 is authorized to receive the browsing history data but not the demographics information. Given these assumptions, HSS/AAA server 240 may determine that app server 255 may receive the browsing history data but not the demographics information and may provide the browsing history data (e.g., based on authentication information that identifies a permission level of app server 255). In some implementations, app server 255 may communicate with some other device to determine the information corresponding to the unique ID (e.g., a device, associated with HSS/AAA server 240, that stores similar information as HSS/AAA server 240).

In some implementations, app server 255 may provide content 560 to user device 210 (e.g., via content provider server 250) based on the information corresponding to the unique ID of user device 210. In some implementations, content 560 may include targeted content (e.g., content that is based on demographics information of a user of user device 210, browsing history data of user device 210, subscription information of user device 210, and/or some other information associated with user device 210 as identified by the unique ID). In some implementations, content 560 may be provided to user device 210 via a portion of a web page (e.g., a web page associated with content request 510) that is reserved for targeted content. Additionally, or alternatively, content 560 may include content relating to an application, a service, a subscription, etc. that may be based on the unique ID.

As described above, content provider server 250 and/or some other device may be a consuming device for the unique ID. That is, content provider server 250 may perform similar functions as app server 255. For example, content provider server 250 may receive object 545, may look up information based on the unique ID of object 545, and may provide content to user device 210 based on the information associated with the unique ID.

While a particular series of operations and/or data flows have been described above with regard to FIG. 5, the order of the operations and/or data flows may be modified in other implementations. Further, non-dependent operations may be performed in parallel. As described above, PGW 220 may serve as a traffic exit/entry point for user device 210. Thus, any data flows provided to/from user device 210 may be provided via PGW 220.

Figure 6:
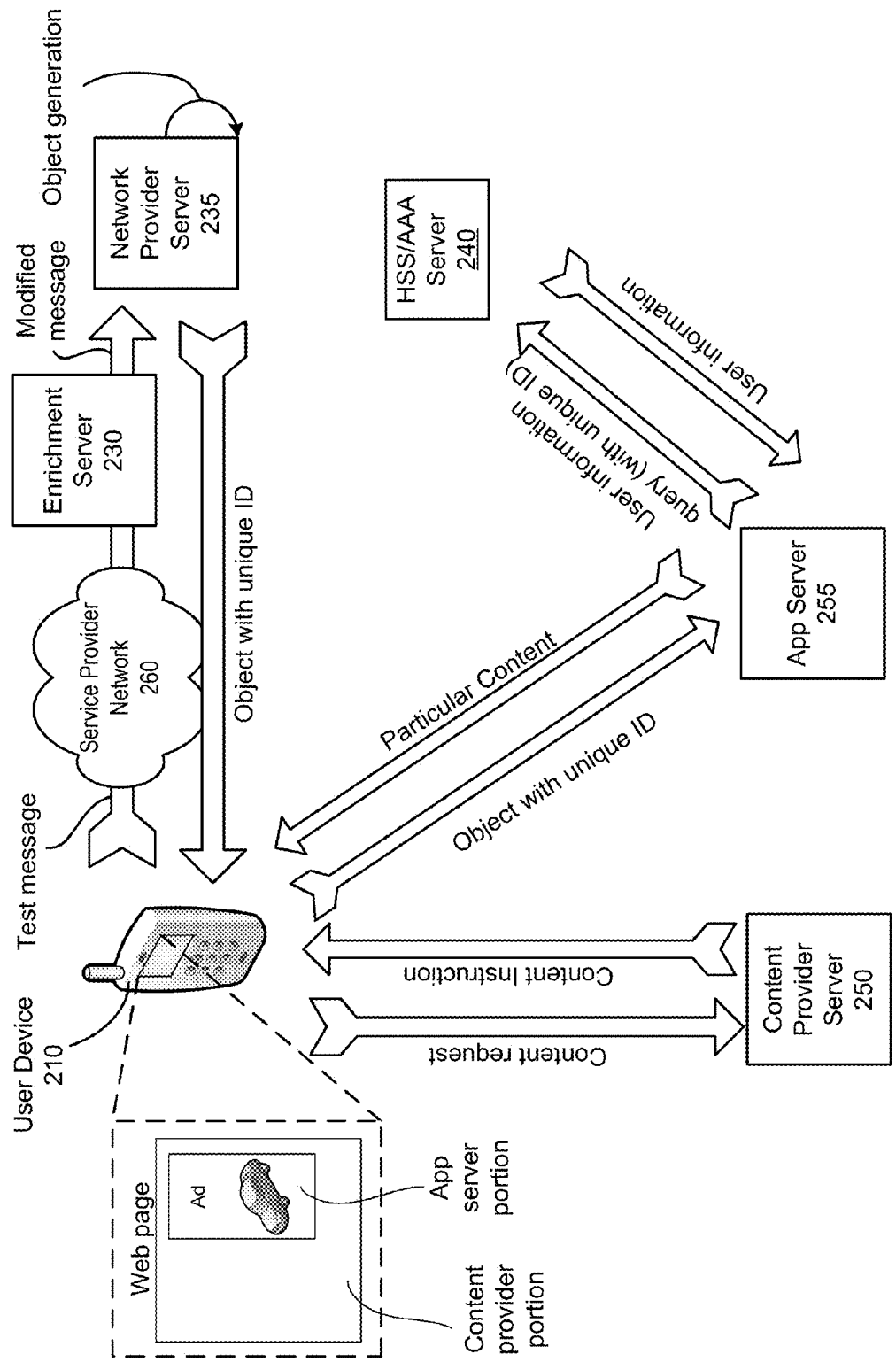
FIG. 6 illustrates an example implementation as described herein.

FIG. 6 illustrates an example implementation as described herein. In FIG. 6, assume that user device 210 provides a request for web page content from content provider server 250. Given this assumption, user device 210 may provide a content request to content provider server 250. Based on receiving the content request, content provider server 250 may provide content provider server 250 with an instruction that includes a request to provide a unique ID, associated with user device 210, to app server 255. For example, app server 255 may provide particular content to user device 210 based on the unique ID (e.g., via a portion of the web page corresponding to the content request).

In some implementations, user device 210 may search a directory in a storage medium of user device 210 that is associated with content provider server 250 to determine whether the unique ID is stored by user device 210. If, for example, user device 210 stores the unique ID (e.g., in the form of an object that includes the unique ID), user device 210 may provide the object to app server 255. If, on the other hand, user device 210 does not store the unique ID, user device 210 may provide a test message towards network provider server 235 (e.g., via service provider network 260).

As described above, enrichment server 230 may receive the test message (e.g., via PGW 220) and may generate a unique ID based on session information received by PGW 220. In some implementations, enrichment server 230 may generate a modified message that corresponds to the test message including the unique ID. Enrichment server 230 may provide the modified message to network provider server 235, and network provider server 235 may generate an object including the unique ID based on receiving the modified message. As shown in FIG. 6, network provider server 235 may provide the object to user device 210 and user device 210 may store the object (e.g., in a directory associated with content provider server 250 and/or in a persistent storage medium, such as a clipboard/pasteboard).

In some implementations, user device 210 may provide the object with the unique ID to app server 255 and app server 255 may provide a user information query (including the unique ID) to HSS/AAA server 240. In some implementations, HSS/AAA server 240 may lookup user information that corresponds to the unique ID and may provide the user information to app server 255. As described above, app server 255 may provide particular content/services based on the user information associated with the unique ID. For example, app server 255 may include a content aggregation function that identifies particular content to provide to user device 210 when the user information meets particular criteria.

For example, when the user's browsing history identifies web pages relating to a particular subject (e.g., cars), app server 255 may identify particular content that relates to the particular subject associated with the user's browsing history. As shown in FIG. 6, app server 255 may provide the particular content to user device 210 (e.g., via content provider server 250) such that the particular content is provided to a portion of the web page associated with the content request. In an example shown in FIG. 6, app server 255 may provide a targeted advertisement relating to the subject of cars (e.g., based on the unique ID of user device 210 that identifies the browsing history of user device 210 relates to the subject of cars).

While a particular example is shown in FIG. 6, it will be apparent that the above description is merely an example implementation. Other examples are possible and may differ from what was described with regard to FIG. 6. For example, the content request may include a request for content relating to a particular service (e.g., a banking service, a gaming service, etc.) or a request for content relating to a subscription. The particular content may be provided by content provider server 250 instead of, or in addition to, being provided by app server 255 and may be delivered from within an application executing on user device 210 (e.g., a web browsing application, a gaming application, a services application, or the like).

As described above, user device 210 may provide a unique ID (e.g., a UIDH), associated with user device 210, to a consuming device of the unique ID (e.g., content provider server 250, app server 255, or the like). In some implementations, the consuming device may use the identifier to determine information associated with user device 210, such as demographics information for a user of user device 210, authentication information, subscription information, user device type information, and/or some other information associated with user device 210. In some implementations, the consuming device may provide particular content to user device 210 (e.g., a targeted advertisement, subscribed content, etc.) based on the information associated with user device 210 as determined by the unique ID. In some implementations, the consuming device may not determine some information regarding the user device, such as identity information of a user associated with user device 210 (e.g., the user's name, address, e-mail address, billing information, etc.). For example, the unique ID may not be associated with the user's identity. As a result, the user may receive content from the consuming device based on the unique ID of user device 210 without divulging the identity of the user to the consuming device.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    providing, by a user device, a request for content to a first server;
    receiving, by the user device and from the first server, an instruction based on providing the request for content, the instruction including a request to provide a unique identifier (ID) of the user device;
    determining, by the user device, whether the unique ID is stored or whether a first object, associated with the unique ID, is expired;
    providing, by the user device and based on determining that the unique ID is not stored or that the first object, associated with the unique ID, is expired, a test message to a second server to cause the second server to embed the unique ID in the test message and form a modified message for transmission to a third server, the modified message causing the third server to form a second object having the unique ID;
    receiving, by the user device and from the third server, the second object based on providing the test message to the second server;
    providing, by the user device, the second object to the first server or to a fourth server; and
    receiving, by the user device and from the first server or the fourth server, particular content based on providing the second object to the first server or the fourth server, the particular content being based on the unique ID.

2. The method of claim 1, further comprising:
    storing the second object in a persistent storage medium or a particular directory, accessible by the first server, based on receiving the second object.

3. The method of claim 1, further comprising:
    determining whether the user device stores the second object in a directory or a persistent storage medium that is accessible by the first server, and
    where providing the second object to the first server or the fourth server comprises:
        providing the second object to the first server or the fourth server abased on determining that the user device stores the second object.

4. The method of claim 1, where the test message is provided via a network associated with the second server or the third server.

5. The method of claim 1, where the second object includes at least one of a time-to-live (TTL) or a timestamp, the second object expiring based on the TTL or the timestamp.

6. The method of claim 1, where the unique ID is associated with user information for a user of the user device,
    the user information identifying at least one of:
        demographics information,
        authentication information,
        a subscriber profile, or
        a user profile, and
    the user of the user device not being identifiable by the first server or the fourth server based on the unique ID or the user information.

7. The method of claim 1, where the test message has a size that is smaller than a particular threshold to minimize network traffic.

8. The method of claim 1, where providing the test message to the second server causes the second server to:
    receive session information having information that uniquely identifies the user device,
    generate the unique ID to uniquely identify the user device based on the session information, and
    form the modified message further based on generating the unique ID.

9. A system comprising:
    a user device to:
        provide a request for content to a first server;
        receive, from the first server, an instruction based on providing the request for content,
            the instruction including a request to provide a unique identifier (ID) of the user device;
        determine whether the unique ID is stored or whether a first object, associated with the unique ID, is expired;
        provide, based on determining that the unique ID is not stored or that the first object, associated with the unique ID, is expired, a test message to a second server to cause the second server to embed the unique ID in the test message and form a modified message for transmission to a third server,
            the modified message causing the third server to form a second object having the unique ID;

receive, from the third server, the second object based on providing the test message to the second server;

store the second object in a persistent storage medium or a particular directory based on receiving the second object;

provide the second object to the first server or to a fourth server; and receive, from the first server or the fourth server, particular content based on providing the second object to the first server or the fourth server, the particular content being based on the unique ID.

10. The system of claim 9, where the user device is further to:

determine whether the user device stores the second object in the persistent storage medium or the particular directory, and where the user device, when providing the second object to the first server or the fourth server, device is to:

provide the second object to the first server or the fourth server based on determining that the user device stores the second object.

11. The system of claim 9, where the test message is provided via a network associated with the second server or the third server.

12. The system of claim 9, where the second object includes at least one of a time-to-live (TTL), or a timestamp, the second object expiring based on the TTL or the timestamp.

13. The system of claim 9, where the unique ID is associated with user information for a user of the user device, the user information identifying at least one of:
demographics information,
authentication information,
a subscriber profile, or
a user profile, and the user of the user device not being identifiable by the first server or the fourth server based on the unique ID or the user information.

14. The system of claim 9, where the test message has a size that is smaller than a particular threshold to minimize network traffic.

15. The system of claim 9, where the user device, when providing the test message to the second server, is to:

provide the test message to the second server to cause the second server to:

receive session information having information that uniquely identifies the user device, generate the unique ID to uniquely identify the user device based on the session information, and form the modified message further based on generating the unique ID.

16. A non-transitory computer-readable medium for storing instructions, the instructions comprising:

a plurality of instructions which, when executed by one or more processors cause the one or more processors to:

provide a request for content to a first server;

receive, from the first server, an instruction based on providing the request for content, the instruction including a request to provide a unique identifier (ID) of a user device;

determine whether the unique ID is stored or whether a first object, associated with the unique ID, is expired;

provide, based on determining that the unique ID is not stored or that the first object, associated with the unique ID, is expired, a test message to a second server to cause the second server to:

receive session information having information that uniquely identifies a user device, generate a unique identifier (ID) to uniquely identify the user device based on the session information, and embed the unique ID of the user device in the test message to form a modified message for transmission to a third server, the modified message causing the third server to form a second object having the unique ID;

receive, from the third server, the second object based on providing the test message to the second server;

provide the second object to the first server or to a fourth server; and receive, from the first server or the fourth server, particular content based on providing the second object to the first server or the fourth server, the particular content being based on the unique ID.

17. The non-transitory computer-readable medium of claim 16, where the plurality of instructions, when executed by the one or more processors, further cause the one or more processors to:

store the first object in a persistent storage medium or a particular directory based on receiving the second object.

18. The non-transitory computer-readable medium of claim 16, where the plurality of instructions, when executed by the one or more processors, further cause the one or more processors to:

determine whether the user device stores the second object in a directory or a persistent storage medium, where the plurality of instructions, when providing the test message to the second server, cause the one more processors to:

provide the test message to the second server based on determining that the user device does not store the second object, and where the plurality of instructions, when providing the second object to the first server or the fourth server, cause the one more processors to:

provide the second object to the first server or the fourth server based on determining that the user device stores the second object.

19. The non-transitory computer-readable medium of claim 16, where the test message is provided via a network associated with the second server or the third server.

20. The non-transitory computer-readable medium of claim 16, where the unique ID is associated with user information for a user of the user device, the user information identifying at least one of:
demographics information,
authentication information,
a subscriber profile, or
a user profile, and the user of the user device not being identifiable by the first server or the fourth server based on the unique ID or the user information.

* * * * *